United States Patent

McCarthy et al.

(10) Patent No.: US 8,915,810 B2
(45) Date of Patent: Dec. 23, 2014

(54) SIMULATED PRESSURIZED BALL AND MANUFACTURING METHOD

(76) Inventors: Kevin McCarthy, Sammamish, WA (US); Tim P. Jahnigen, Berkley, CA (US)

( * ) Notice: Subject to any disclaimer, the term of this patent is extended or adjusted under 35 U.S.C. 154(b) by 213 days.

(21) Appl. No.: 12/842,648

(22) Filed: Jul. 23, 2010

(65) Prior Publication Data

US 2011/0021297 A1 Jan. 27, 2011

Related U.S. Application Data

(60) Provisional application No. 61/228,128, filed on Jul. 23, 2009.

(51) Int. Cl.
*A63B 39/00* (2006.01)
*A63B 45/00* (2006.01)
*B29C 44/08* (2006.01)
*B29L 31/54* (2006.01)

(52) U.S. Cl.
CPC ............. *A63B 39/00* (2013.01); *B29L 2031/54* (2013.01); *A63B 45/00* (2013.01); *A63B 2039/003* (2013.01); *B29C 44/08* (2013.01)
USPC ........................................................ 473/611

(58) Field of Classification Search
USPC .................. 473/607–609, 611–613
See application file for complete search history.

(56) References Cited

U.S. PATENT DOCUMENTS

| | | | | | |
|---|---|---|---|---|---|
| 1,513,773 | A | * | 11/1924 | Thompson | 473/576 |
| 1,595,441 | A | * | 8/1926 | Zenger | 473/571 |
| 1,612,651 | A | * | 12/1926 | Roberts | 156/61 |
| 1,668,785 | A | * | 5/1928 | Smart | 446/184 |
| 2,115,926 | A | * | 5/1938 | Hatton | 473/596 |
| 2,469,892 | A | * | 5/1949 | Rempel | 428/36.8 |
| 4,463,591 | A | * | 8/1984 | McCullough | 72/360 |
| 4,660,830 | A | * | 4/1987 | Tomar | 473/601 |
| 5,123,659 | A | * | 6/1992 | Williams | 473/601 |
| 5,375,839 | A | * | 12/1994 | Pagani | 473/570 |
| 6,557,496 | B2 | * | 5/2003 | Herrenbruck | 119/707 |
| 8,071,175 | B2 | * | 12/2011 | Baik | 427/402 |
| 8,168,026 | B1 | * | 5/2012 | Brown et al. | 156/245 |
| 2003/0130076 | A1 | * | 7/2003 | Lacroix et al. | 473/593 |
| 2006/0288600 | A1 | * | 12/2006 | Taylor | 34/60 |
| 2008/0045364 | A1 | * | 2/2008 | Heland | 473/607 |

* cited by examiner

*Primary Examiner* — Gene Kim
*Assistant Examiner* — Amir Klayman
(74) *Attorney, Agent, or Firm* — Dean A. Craine (57) ABSTRACT

A non-pressurized sport ball that simulates the resiliency, rebound, hardness and weight properties of a similar sized, inflatable sports ball. The sports ball, which can be made in different sizes and shapes, includes a hollow ball body with relatively thick sidewalls made of closed-cell foam, elastomeric resin. When cured, the sidewalls have compression and resiliency properties that enable the working action of the sidewalls to be used in place of an air bladder in an inflatable sports ball. Formed on the ball body is an entry hole in which an air escaping cap is inserted made of the same elastomeric resin material as the ball body. During use, the cap flexes within the entry hole to allow air to exit and enter the ball during use so that the internal and external air pressures are equal. Also disclosed is a method of manufacturing the sports ball using a mandrel and a suitable-shaped compression mold with an entry hole formed on one side.

12 Claims, 8 Drawing Sheets

SIMULATED PRESSURIZED BALL AND MANUFACTURING METHOD

This is a utility patent application which claims benefit of U.S. Provisional Application No. 61/228,128, filed on Jul. 23, 2009.

Notice is hereby given that the following patent document contains original material which is subject to copyright protection. The copyright owner has no objection to the facsimile or digital download reproduction of all or part of the patent document, but otherwise reserves all copyrights whatsoever.

BACKGROUND OF THE INVENTION

1. Field of the Invention

This invention pertains to balls that simulate pressured sports balls used for kicking, catching, and throwing and more particularly, to sports balls that maintain their uniform bounce and resiliency by an internal volume of air under different environmental conditions 2. Description of the Related Art Many sports, such as soccer, football, rugby, volley ball, and basketball, require the use of an inflatable ball that have an inflated internal bladder or bag, generally made of rubber, which, in most cases, is covered by an outer textile layer made of natural or synthetic fibers or filaments. Formed on the outer surface of the ball is a valve in which a valve needle connected to an air pump is inserted and used to inflate the internal bladder or bag. In order to ensure the integrity of the textile layer, is combined with a composition, which is generally vulcanized or cured, with a natural or synthetic rubber. A final outer coating is then applied on this composition.

One drawback with inflatable balls is that the air inside the ball contracts or expands in cold and hot weather and in different elevations. In some regions of the world however, where valve needles and air pumps are not available, users are unable to inflate the balls. Eventually, the balls become so deflated and they are discarded. Inability to inflate these balls is a major reason why the citizens in some regions of the world do not play sports that require an inflatable ball.

Another drawback with inflatable balls is that the outer textile layer or outer coating on the ball eventually wears away so that the air bladder is exposed. Eventually, the internal bladder or bag is punctured.

What is needed is a sport ball that simulates a pressurized inflatable ball that does not require inflation and has thick sidewalls that are more durable than the outer coating or textile layer used on a standard pressurized sports ball.

SUMMARY OF THE INVENTION

It is an object of the present invention to provide a non-pressurized inflatable sports ball that closely simulates the resiliency, bounce, hardness, and low weight of a pressurized sports ball.

It is another object of the present invention to provide such a sports ball that is not affected by ambient air pressure, temperature, and moisture and is more durable than a pressurized, inflatable sports ball.

It is a further object of the present invention to provide a relatively inexpensive method for manufacturing such a sports ball in different shapes and sizes.

These and other objects of the present invention are met by the sport ball and method of manufacturing disclosed herein. The sports ball is a light-weight, waterproof, non-pressurized, "breathable" structure that is designed to simulate the resiliency, rebound, hardness and weight properties of a similar sized, pressurize, inflatable sports ball. The sports ball, which can be made in different sizes and shapes, is a hollow structure with relatively thick sidewalls made of specialized closed-cell foam, elastomeric resin. When cured, the sidewalls have sufficient compression and resiliency properties that enable the working action of the sidewall to use in place of air or an air bladder typically found in an inflatable sports ball. The sidewall are relatively thick and when the resin is cured, the ball is durable and resistant to normal wear and tear, water absorption and punctures.

The ball includes a ball body with a relatively large entry hole form thereon. Disposed into the entry hole is a moveable cap with an outer surface that is complimentary in shape and texture with the area of the ball body that surrounds the entry hole. The cap is made of the same elastomerical resin as the body. The cap may be affixed inside the entry hole by a mechanical interlock or by a suitable adhesive. When the ball is kicked or hit, or exposed to different ambient temperatures and air pressures, the air inside the ball is able to exchange through the entry hole with the outside air so that they become equal.

Also disclosed herein a novel method of manufacturing a sports ball that allows the thickness of the sidewalls to be adjusted to achieve the desired hardness and rebound properties found with different inflatable sports balls. During manufacturing, an undersized thermo-set injection mold is used which allow a reduce-scaled mandrel, which forms the ball's inner surface, to be placed between two reduce-scaled cavity halves. When joined, the two halves folin the ball's outer surface. An entry hole is formed on the side of the mold through which the support structure for the mandrel is extended. The entry hole is smaller than the spherical end of the mandrel. After curing, the two halves of the molds are quickly separated. The cross-linked expandable resin inside the mold then instantaneously expands, enlarging the finished ball to its full size. The ball and the entry hole in the ball have expanded such that the mandrel's larger spherical end can be easily removed. The expansion ratio of the ball, compared to the mold size is from about 1.4:1 up to 2.0:1.

DESCRIPTION OF THE PREFERRED EMBODIMENT(S)

Referring to the accompanying FIGS. 1-17 there is shown a non-pressurized, non-inflatable structured sports ball 10 and designed to simulate the resiliency, rebound, hardness and weight properties of a similar sized, pressurize, inflatable sports ball. The sports ball 10 which can be made in different sizes and shapes, is a hollow structure with a relatively thick sidewalls 40 made of closed-cell foam, elastomeric resin. When cured, the sidewalls 40 has compression and resiliency properties that enable the working action of the sidewalls 40 to be used in place of an air bladder commonly used in an inflatable sports ball. The sidewalls 40 are relatively thicker than the sidewall found on a commonly used sports ball thereby making the ball 10 more durable and resistant to wear and tear and punctures. The sidewalls 40 of the ball 10 forms a partially enclosed ball body 12 whereby both compression and tension forces on the sidewalls 40 provide the working action on the ball rather than air pressure located inside the ball or in an air bladder.

The ball 10 also includes a moveable cap 20 that fits into an entry hole 18 formed on the ball's body 12. The cap 20 is mechanically engaged to the inside surface of the side wall 40 that surrounds the entry hole 18 so that when the ball 10 is kicked or hit, or exposed to different ambient temperatures and air pressure, the air 90 inside the ball 10 is able to flow around the perimeter edge 24 of the cap 20 and exchange with the outside air 92. (see force 'F' denoted in FIG. 1).

Figure 1:
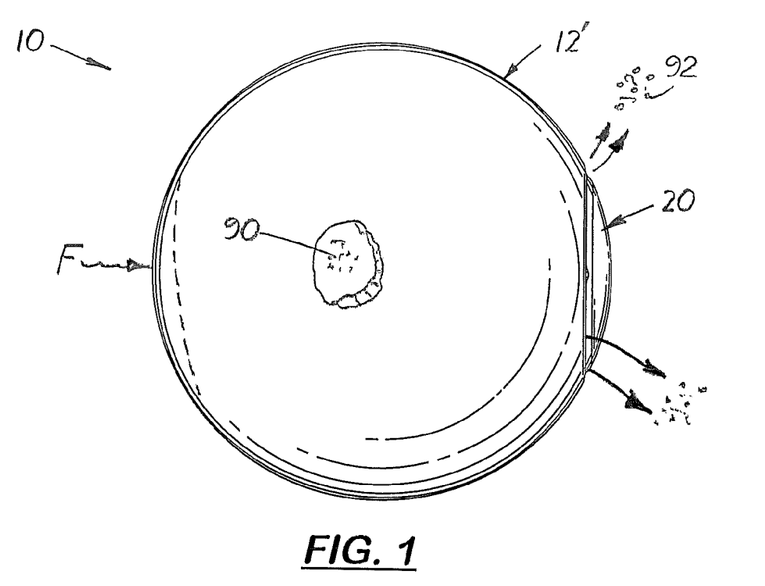
FIG. 1 is a side elevational view of a non-inflatable spherical sports ball.
Figure 2:
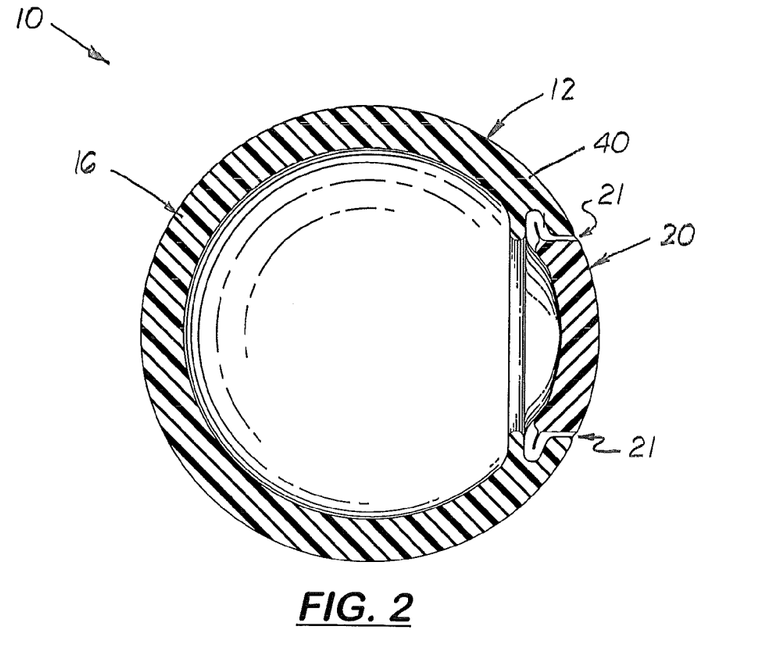
FIG. 2 is a sectional side elevational view of the sports ball shown in FIG. 1.
Figure 3:
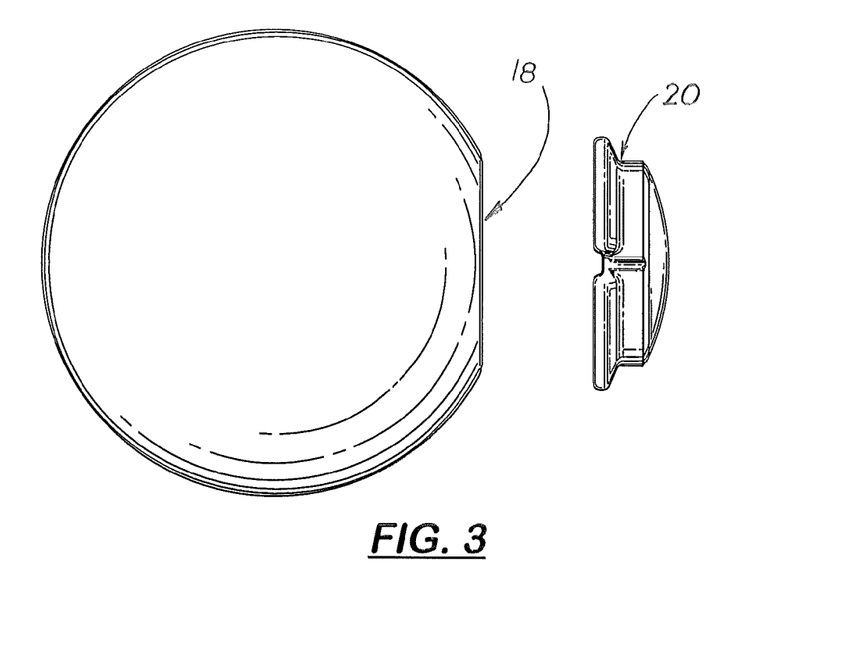
FIG. 3 is a side elevational view of a non-inflatable spherical sports ball shown in FIG. 1 showing the cap detached from the ball body.
Figure 4:
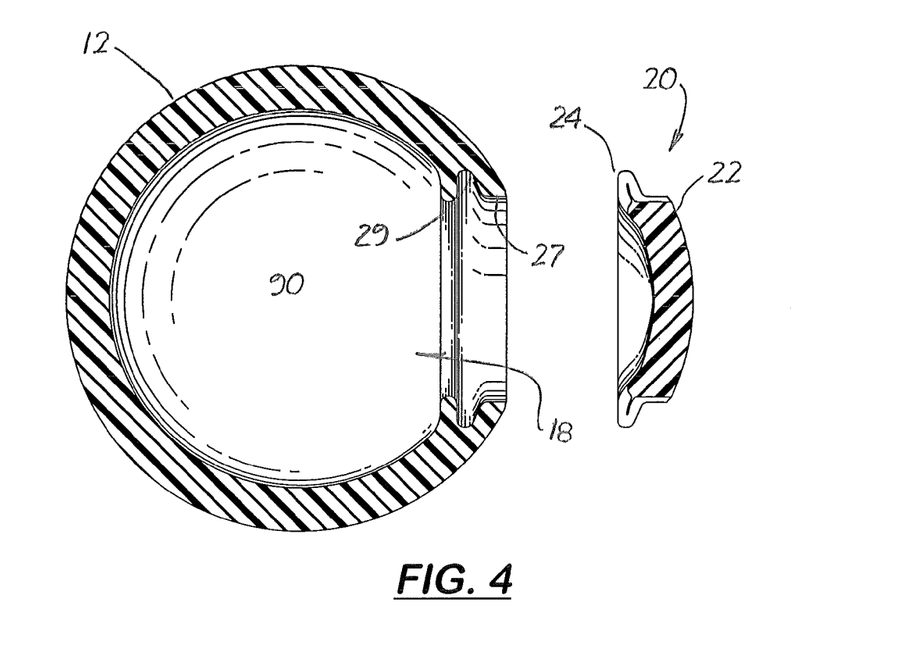
FIG. 4 is a sectional side elevational view of the sports ball shown in FIG. 3.
Figure 5:
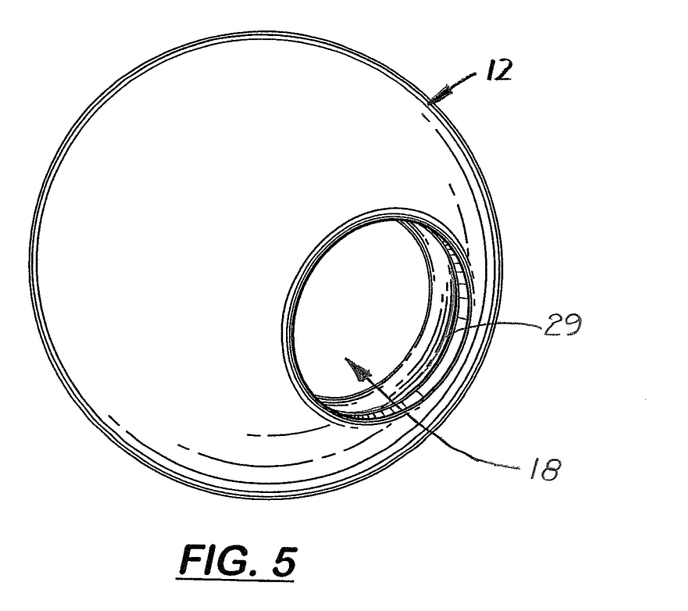
FIG. 5 is a perspective view of the ball body with the cap detached.
Figure 6:
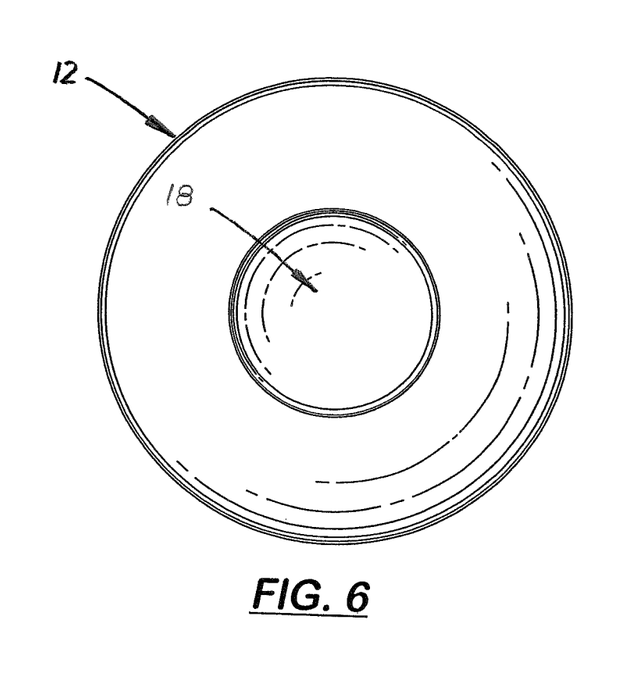
FIG. 6 is a front elevational view of the ball body with the cap detached shown in FIG. 5.

The cap 20 includes a cap body 22 with an outer surface 23 that matches the shape and texture of the outer surface 13 of the ball body 12. Formed on the cap 20 is an outer extending perimeter circular lip 24 that engages a compatible circular slot 29 formed on the inside surface 27 of the entry hole 18. The cap body 22 is slightly smaller that the diameter as the entry hole 18 thereby forming a small gap 21 therebetween. As shown in FIGS. 2 and 4, the inside surface 19 of the ball body 12 adjacent to the entry hole 18 bends inward and is thicker to accommodate the circular slot 29.

Figure 7:
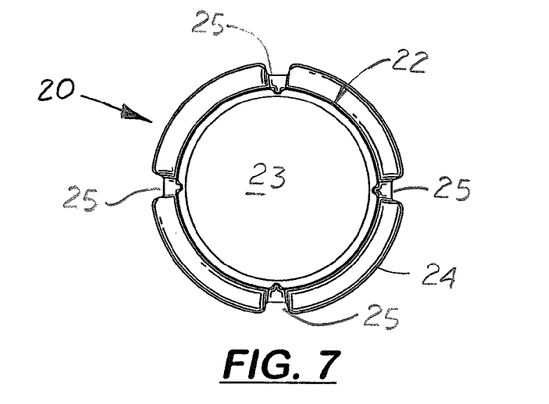
FIG. 7 is a top plan view of the cap.
Figure 8:
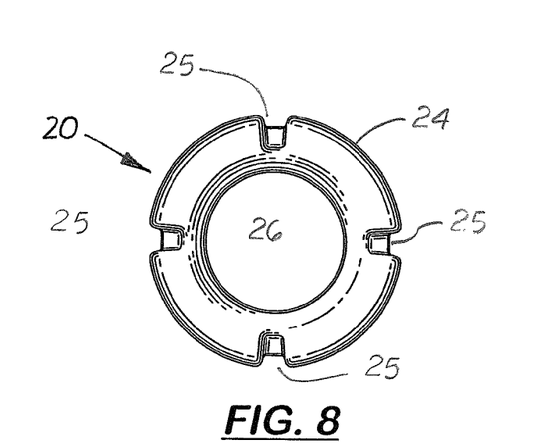
FIG. 8 is a bottom plan view of the cap.
Figure 9:
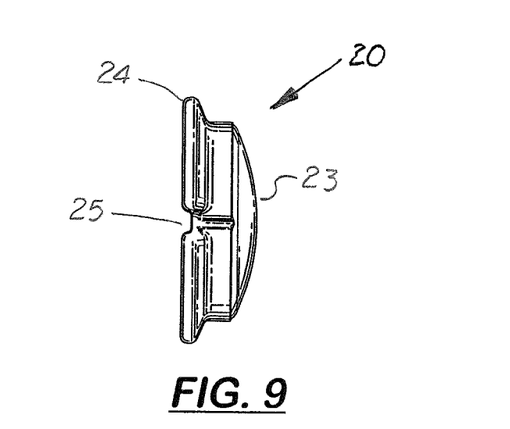
FIG. 9 is a side elevational view of the cap.

When the cap 20 is inserted into the entry hole 18, the lip 24 engages the slot 29 to mechanically hold the cap 20 inside the entry hole 18. As shown in FIGS. 7-9, formed on the perimeter edge 24 and on the sides of the cap body 22 are a plurality of longitudinally aligned, optional cutouts 25. The cutouts 25 are designed to allow air 90 or 92 to pass more freely around the cap 20 when placed into the entry hole 18.

When the ball 10 is kicked or hit, the sidewalls 40 of the ball 10 are forced inward that forces the air 90 inside the ball 10 against the cap 20. The air 90 then causes the cap 20 to bend outward thereby distorting the lip 24 so that the air 90 may escape. When the sidewalls 40 recovers to its original shape, a vacuum is created inside the ball 10 that draws outside air 94 into the ball 10. Because the cap 20 is not sealed over the entry hole 18, the inside air 90 and outside air 92 may be freely exchanged and remain equal.

It should be understood that the thickness of the sidewalls 40 has a direct relationship to the size of the entry hole 18, the size of the ball body 12 and the ball's weight, hardness, resiliency and bounce. For most balls, the thickness of the sidewall 40 is between 0.300 to 1.00 inches but not limited to these specific amounts. The cap 20 is shown as a cylindrical structure but may be oval, square or triangular. Also for most sports balls, the width or diameter of the cap 20 may be ¼ inches to 5 inches depending on the overall size of the sports ball and the sidewall thickness and its location on the ball body 12. The perimeter edge 24 extends approximately 0.25 to 0.5 inches from the cap body 22.

Figure 10:
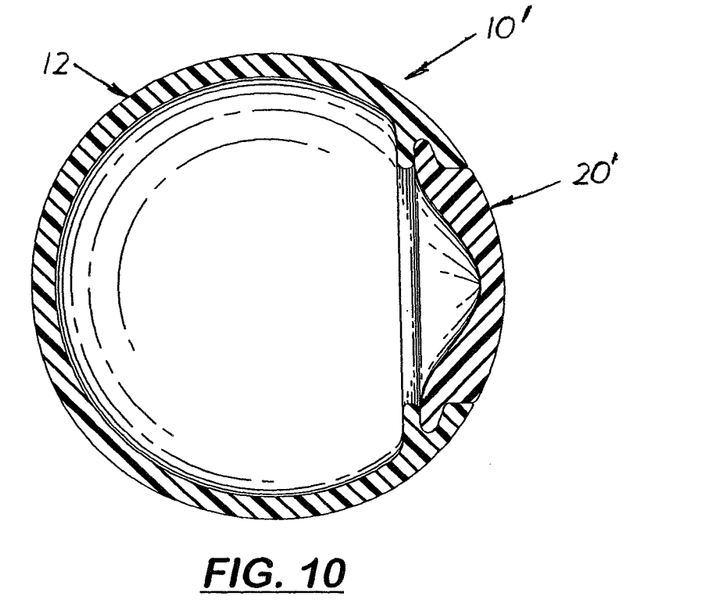
FIG. 10 is a sectional side elevational view of the sports ball with a thinner sidewall than the sports ball shown in FIG. 1.
Figure 11:
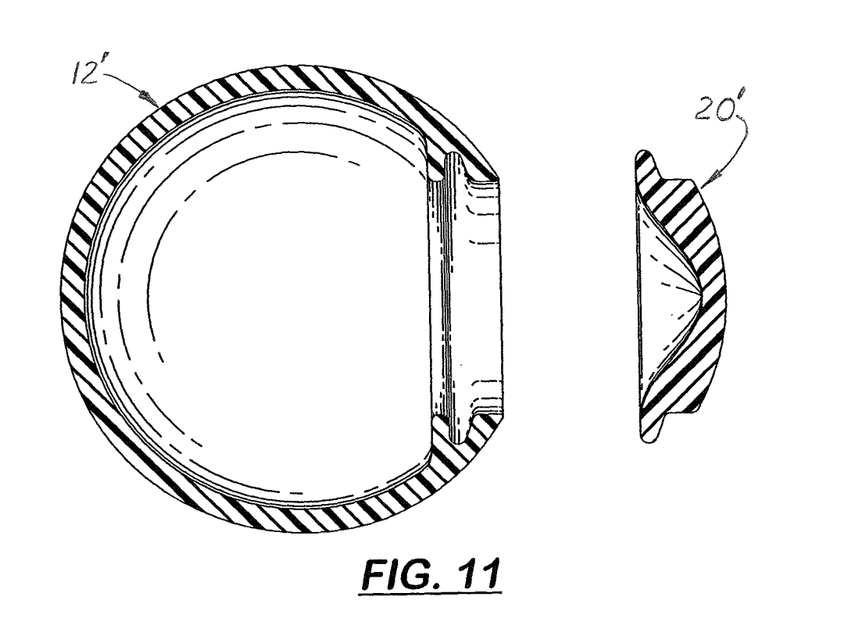
FIG. 11 is a side elevational view of the sports ball shown in FIG. 10 showing the cap detached from the ball body.
Figure 12:
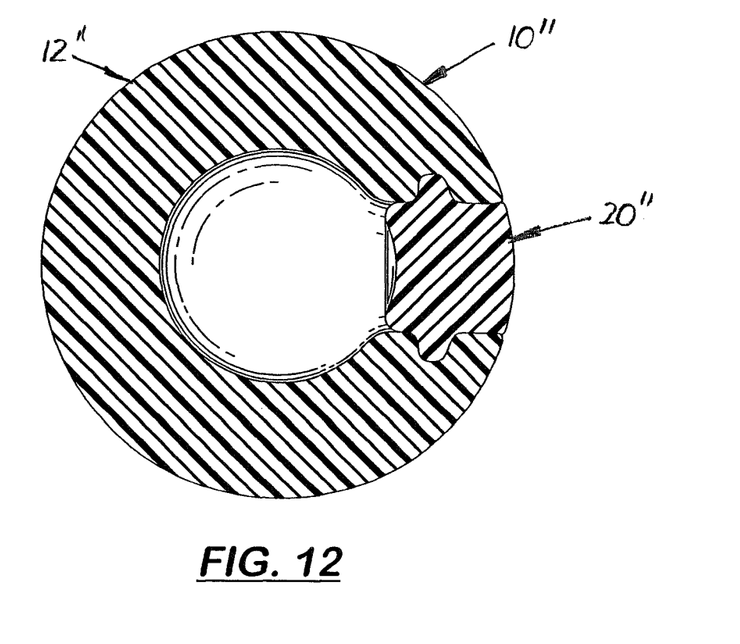
FIG. 12 is a sectional side elevational view of the sports ball with a thicker sidewall than the sports ball shown in FIG. 1.
Figure 13:
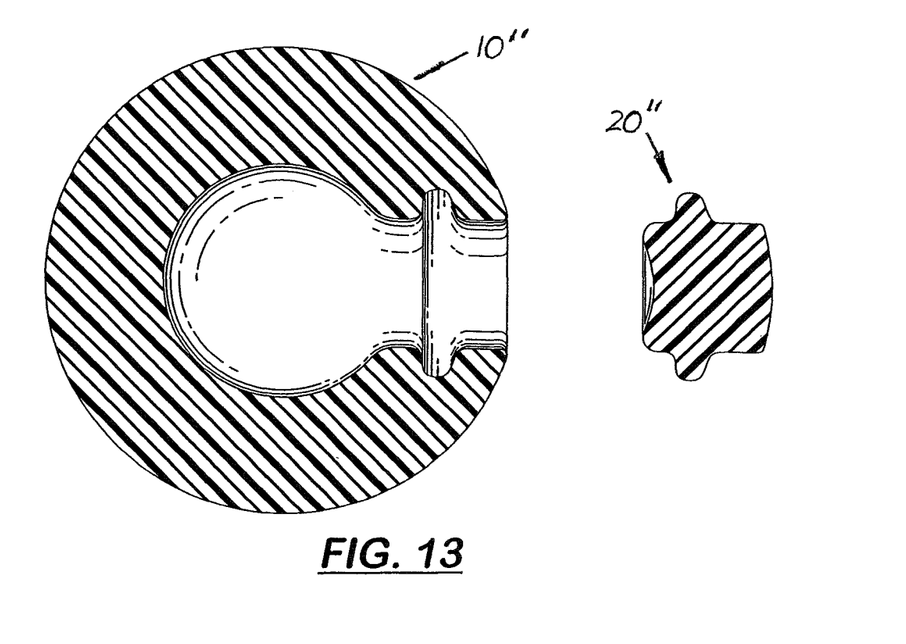
FIG. 13 is a side elevational view of the sports ball shown in FIG. 12 showing the cap detached from the ball body.

FIGS. 10 and 11 show an alternative sports ball 10' with a thinner sidewall 12' and a relatively large cap 20'. FIGS. 12 and 13 show another sports ball 10" that has a thick sidewall 12" and a narrow cap 20".

Figure 14:
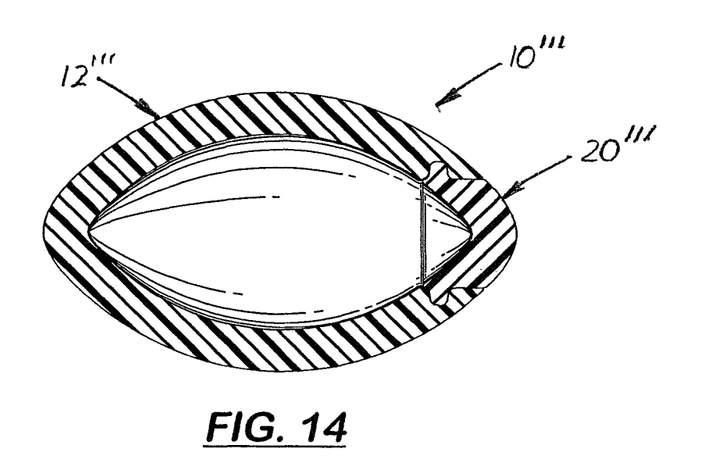
FIG. 14 is a sectional side elevational view of an oval-shaped sports ball.
Figure 15:
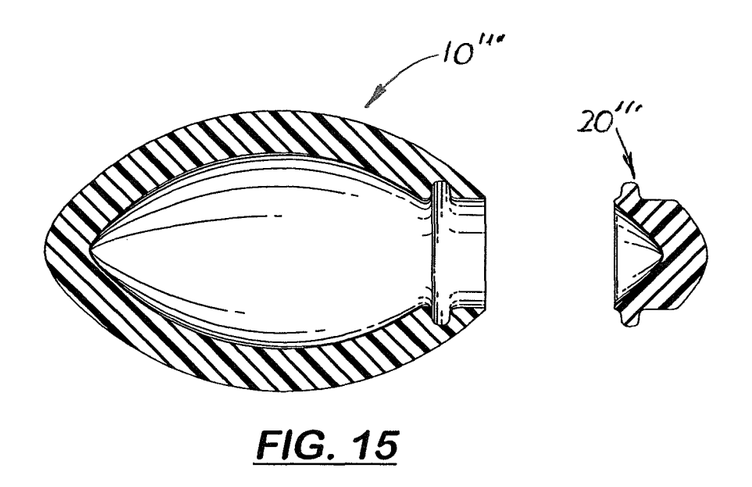
FIG. 15 is a side elevational view of the oval-shaped sports ball shown in FIG. 14 showing the cap detached.

The shape or style of sports ball is not limited to a spherical ball. As shown in FIGS. 14 and 15, the sports ball (denoted 10''') may be an elliptical ball, such as a football, with the cap 20''' forming the tip of the ball.

Figure 16:
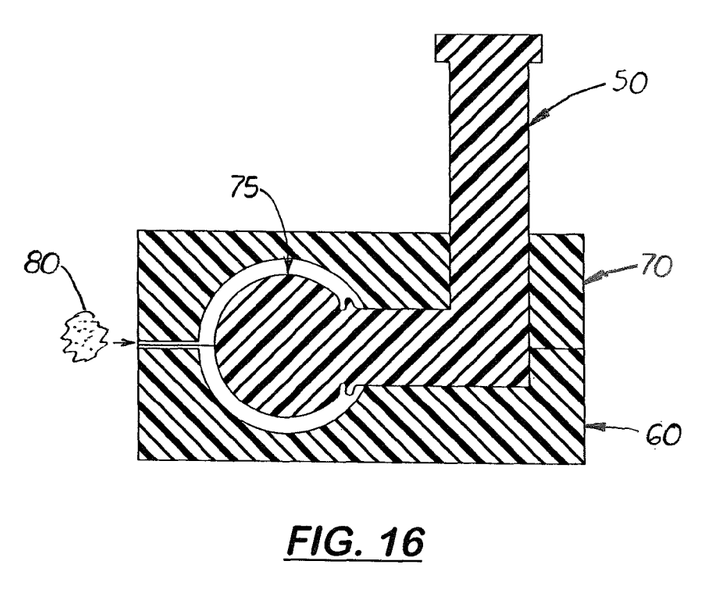
FIG. 16 is a sectional side elevational view of the mold closed, and with un-foamed resin injected into the cavity space of the closed mold.

The method of manufacturing the sports ball 10 includes the first step of selecting an interior mandrel 50 placed into one-half mold section 60. The mandrel 50 includes a head 52 and an integrally attached neck 55. After the mandrel 50 is placed into the curved cavity 62 formed on the first one-half mold section 60, the second one-half mold section 70 is then place over the opposite side of the mandrel 50 and connected to the first half mold section 60. The second one-half mold section 70 includes a semi-spherical cavity 72 that is complimentary to the semi-spherical cavity 62 on the first one-half mold section 60. The shape and size of the head 52 on the mandrel 50 and the size and shape of the cavities 62, 72, of the two mold sections 60, 70, respectively, may be varied depending on the size and shape of the sports ball and the desired hardness and rebounding characteristics. A composition 80 made of closed-cell foam plastic of a density between 0.800 sg and 0.050 sg is then injected into the space 75 folined between the mandrel 50 and the inside surfaces of the two mold sections 60, 70. The thickness of the space 75 may vary by using different diameter spherical heads 52.

As stated above, an entry hole 18 is formed on the sports ball 10. In the preferred embodiment, the entry hole 18 is formed by the cylindrical neck 55 formed on the mandrel 50 Formed on the perimeter of the neck 55 is a circular lip 57 that extends into the exposed surface of the composition 80 to form the slot 29 along the entry hole 18.

Figure 17:
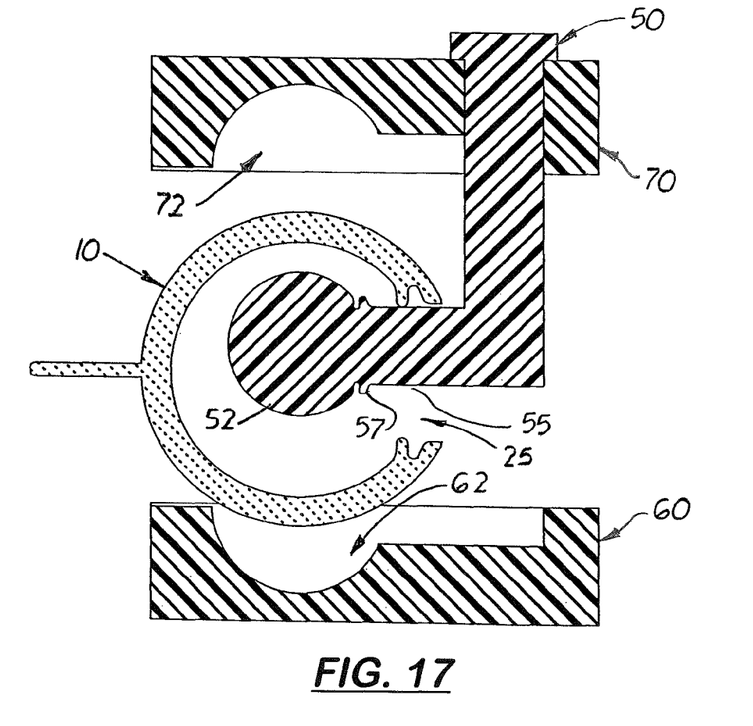
FIG. 17 is a sectional side elevational view of the mold opened, and with the expanded foam resin ball resting on the mandrel, whereby the opening of the ball has expanded to allow for removal.

After curing, the two sections 60, 70 are separated and the mandrel 50 moves away from the two cavity halves as shown in FIG. 17. The ball is free to expand to its final size due to a foaming agent in the composition 80. The entry hole 18 formed in the ball 10 also expands proportionately and the ball body 12 is now easily removed from the head 52 on the mandrel 50. The formulation of the composition 80 can adjust so that a variety of ball sizes can produce from one mold. The expansion ratio can vary between 1.2 to 1, up to 2.0 to 1. A cap 20 made of the same composition 80 is manufactured by the same specialized thermo-set injection molding technique.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

We claim:

1. A non-inflatable sports ball, comprising:
   a. a hollow ball body that includes outer sidewall surrounding an empty inner cavity filled with air maintained at the same air pressure as atmospheric air surrounding said ball body at all times, said sidewalls made of cured, closed-cell elastomeric resin foam, said ball body also includes an entry hole that extends through said sidewall and communicates with said inner cavity to allow air in said inner cavity to be freely exchanged with air located outside said ball body so that the air pressures inside said inner cavity and outside said ball body are equal;
   b. a flexible cap disposed inside said entry hole, said cap made of cured, elastomeric resin foam that bends or flexes outward when air inside the inner cavity is forced against said cap when an impact force is applied to said ball body, said cap includes an outer surface that is complimentary with said outer sidewall on said ball body so that when said cap is placed inside said entry hole, the outer surface of said cap is aligned with said sidewall surrounding said entry hole to form a fully enclosed sports ball, said cap includes a perimeter lip that engages said ball body surrounding said entry hole that mechanically holds said cap inside said entry hole, and,
   c. an air gap formed between said cap and said entry hole enabling air inside said inner cavity and air outside said ball body to be freely exchanged so their pressures remain equal thereby eliminating the requirement that the sports ball be inflated.

2. The sports ball, as recited in claim 1 wherein said elastomeric resin has a density between 0.800 sg and 0.050 sg. after curing.

3. The sports ball, as recited in claim 1, wherein the thickness of said sidewall is 0.300 to 1.0 inches.

4. The sports ball, as recited in claim 1, wherein said ball body is spherical.

5. The sports ball, as recited in claim 1, further including a slot formed on said ball body surrounding said entry hole configured to engage said perimeter lip when said cap is inserted into said entry hole, said perimeter lip and said slot also configured to create said air gap to allow air inside said inner cavity and air outside said ball body to be freely exchanged.

6. The sports ball, as recited in claim 5, further including at least one cut out formed on said outer surface of said cap that communicates with said air gap.

7. The sports ball, as recited in claim 5, wherein said cap is cylindrical.

8. A non-inflatable sports ball, comprising:
   a. a hollow ball body that includes outer sidewall surrounding an empty inner cavity filled with air maintained at an air pressure equal to the air pressure of atmospheric air surrounding said ball body at all times, and an entry hole with a circular slot formed thereon, said sidewall made of cured, closed-cell elastomeric resin foam with a density range between 0.800 sg and 0.050 sg after curing; and,
   b. a flexible cap affixed inside said entry hole, said cap includes cap body with an outward extending perimeter lip that loosely engages said circular slot to mechanical hold said cap inside said entry hole and form an air gap between said cap and said entry hole that allows air to flow freely into and out of said inner cavity to equalize the air pressures inside said inner cavity and outside said ball body and thereby eliminating the requirement that the sports ball be inflated, said cap body also includes with an outer surface that is complimentary with said ball body so that when said cap is placed inside said entry hole, the outer surface of said cap body is aligned with said outer sidewall to form a fully enclosed sports ball, said cap made of cured elastomeric resin foam and sufficiently flexible so that when an impact force is exerted on said ball body air located in said inner cavity is forced outward against said cap causing said cap to flex outward and allow air inside said inner cavity to escape and when said impact force is removed, said sidewalls rebound to their original shape causing air located outside said ball body to flow through said entry hole and into said inner cavity until the air pressures located inside and outside said ball body are equal.

9. The sports ball, as recited in claim 8, wherein the thickness of said sidewall 0.300 to 1.0 inches.

10. The sports ball, as recited in claim 8, wherein said ball body is spherical.

11. The sports ball, as recited in claim 1, wherein said cap is made of elastomeric resin foam.

12. The sports ball, as recited in claim 8, wherein said cap body includes longitudinally aligned cutouts that communicate with said air gap formed between said cap and said entry hole.

* * * * *